B. E. ALLISON.
RATE AND QUOTATION SHEET.
APPLICATION FILED JAN. 9, 1909.

967,701.

Patented Aug. 16, 1910.

Fig. 1.

Fig. 2.

B — By fast Freight
% — Above Market
L — Credit Good
C — Ship at Once
X — Credit Fair
9 — 10% Below Market
1 — At the Market
0 — No Credit
2 15 — 5% Above Market

WITNESSES

INVENTOR
Benjamin E. Allison
BY
ATTORNEYS

UNITED STATES PATENT OFFICE.

BENJAMIN ESTELL ALLISON, OF KANSAS CITY, MISSOURI.

RATE AND QUOTATION SHEET.

967,701.   Specification of Letters Patent.   Patented Aug. 16, 1910.

Application filed January 9, 1909.   Serial No. 471,439.

*To all whom it may concern:*

Be it known that I, BENJAMIN ESTELL ALLISON, a citizen of the United States, and a resident of Kansas City, in the county of Jackson and State of Missouri, have invented a new and Improved Rate and Quotation Sheet, of which the following is a full, clear, and exact description.

This invention relates to rate and quotation sheets adapted to be used separately or bound together in book form, for use in commercial enterprises dealing with the sale of merchandise, and relates more particularly to a sheet of this kind having series of shipping and receiving points indicated thereon, intersecting columns from these points and each including one of the same so that railroad shipping rates can be inscribed upon the sheet at the column intersections, to indicate the cost of shipping merchandise from any one shipping point to any one receiving point; it has spaces or divisions, each corresponding to one of the column intersections and intended to have inscribed therein price quotations on merchandise, these quotations depending upon the shipping rates and certain other conditions. Further spaces corresponding to the quotation spaces are intended to have the dates of the quotations inscribed therein. The sheet may have sub-divisions each corresponding to a receiving point and intended to have customers' or purchasers' names inscribed therein, the sub-divisions having adjacent thereto, columns intended to have reference characters inscribed therein and corresponding to the customers' names, and indicating, for example, commercial ratings, etc.

The object of the invention is to provide a simple, inexpensive and compactly arranged rate and quotation sheet for use in commercial enterprises dealing with the sale of merchandise, which serves as a record of price quotations on merchandise to customers or purchasers located at various receiving points, the quotations depending upon the railroad rates to the receiving points from shipping points at which competing concerns are located, which affords a record of past quotations, and at the same time constitutes a reference regarding the ratings and other characteristics of the purchasers.

The invention consists in the arrangement of parts to be more fully described hereinafter and particularly set forth in the claims.

Reference is to be had to the accompanying drawings forming a part of this specification, in which Figure 1 is a plan view of a part of a rate and quotation sheet consisting of an embodiment of my invention; and Fig. 2 is a plan view of a part of a table which can be used therewith.

Referring more particularly to the drawing, I provide a sheet A, of any suitable material and having the columns, divisions, spaces, etc., as will apear more clearly hereinafter, indicated thereon by printing, ruling or in any other convenient manner. At the right hand of the center of the sheet and arranged longitudinally thereof is a series of ruled spaces B of shipping points each arranged in a sub-division $b$ formed by lines at right angles with each other and having printed or otherwise indicated therein the names $b'$ of various cities or railroad stations. If so desired, the sub-divisions $b$ may also include initials $b^2$ of railroad lines, or figures $b^3$ indicating population. Extending across the page, and at right angles to the series of ruled spaces B is a series C of receiving points consisting of ruled sub-divisions $c$ each having inscribed therein the name $c'$ of a city or railroad station. If so desired, certain of the sub-divisions $c$ may be left blank so that the names of other shipping points can be written in from time to time.

I provide columns 10 extending across the page from the receiving points, and columns 11 extending longitudinally of the page from the shipping points. These columns at their intersections form sub-divisions or spaces 12. It will be understood that each column includes either a shipping point or a receiving point, and the spaces or blanks at their intersections are intended to have inscribed therein the current shipping rates from the corresponding shipping points to the corresponding receiving points. For example, the shipping rate from St. Louis to Burrton is 20, and this figure is inscribed at the intersection of the proper columns. Again, the shipping rate from Dewey to Bushong is 45, and this figure is likewise inscribed at the proper point. There is a plurality of these subdivisions 12 for each shipping point, to allow for rate changes.

The column intersections or spaces corresponding to all the shipping points and each of the receiving points are preferably included in the divisions D indicated by lines of heavier ruling. At the right of the divisions D are corresponding divisions E which are provided with sub-divisions or spaces $e$ each corresponding to an intersection of the columns 10 and 11. These spaces $e$ are intended to have inscribed therein the quotations or rate bases, as will appear more clearly hereinafter. Above the series of divisions E is a division F having blanks or spaces $f$ each of which corresponds to one of the spaces $e$ of a division E. The spaces $f$ are intended to have written therein the different dates $f'$ upon which the quotations or rate bases $e'$ were inscribed in the corresponding spaces $e$. As each space $f$ has a space $e$ corresponding thereto in alinement and location, the date upon which each quotation was made can be told by referring to the corresponding date space.

Various explanatory or indicative words can be employed in connection with the sheet, for example, at the space 13 forming the intersection of the series of shipping points and the series of receiving points, the words "From" and "To" can be printed. Again, above the division F the words "Quotations and date" can be printed.

At the left of the sheets are divisions G and H, including lines 14 upon which the names of customers or purchasers can be inscribed. The divisions G and H correspond to the divisions D, and thus the customers whose names are written in the divisions G and H will be found at the receiving points of the corresponding divisions D. Each of the divisions G and H has adjacent thereto a division I. The lines 14 are extended through the division I, so that the latter can have inscribed therein reference characters designating corresponding customers whose names are inscribed in the divisions G and H. Furthermore, the columns of divisions I may be represented at the top by the word "Reference" or a similar characterization, while the columns of divisions G and H can be similarly indicated by the word "Customers."

In using my rate and quotation sheet, the shipping rates are obtained from any suitable source for example, from a freight association, or from the railroads themselves, and are filled in at the proper spaces 12 formed by the intersections of the columns 10 and 11. The rate bases are then from time to time inserted in the spaces $e$, the corresponding dates being at the same time inscribed in the spaces $f$. The rate bases are determined by various conditions, including the shipping rates, the prices of competitors, minimum factory prices, etc. For example, it is desired to inscribe a rate basis upon the sheet on a certain date to determine the price to be quoted to a customer in Burrton. The price to be quoted is to equal the lowest competing price. It has been ascertained that a competing firm in Portland has offered the lowest rate, and it is then seen that to this rate must be added the 25 which constitutes the shipping rate from Portland to Burrton. The shipping point of the purchaser making up the rate sheet is at Alstair, and the shipping rate from Alstair to Burrton is 10. With these factors in view, the rate basis can be inserted in the proper space $e$. It is then seen that the customer has reference characteristics which indicate that for one reason or another he is to be quoted prices 10% under the normal or base rate, consequently, the rate basis is reduced by 10% and the resulting price is quoted to the customer.

It will be seen that the shipping rates inscribed upon the rate sheet may be per hundredweight or per other unit, while the rate basis may include a shipping cost per barrel or per other unit; consequently it may be of advantage to use an auxiliary comparative table for quickly changing shipping rates per one unit to shipping rates per some other unit.

At the extreme right of the sheet is a wide column 15 which can be used for indexing in any suitable manner.

It should be clearly understood that my invention can be used in connection with various commercial enterprises which depend upon the sale of merchandise to purchasers at various points, and in which it is necessary to provide these purchasers with price quotations at different intervals, these quotations depending upon various conditions, such for example, as the shipping rates between the point at which the purchaser is located and other points at which competing firms or concerns are engaged in business, as well as current market prices, factory prices, cost to manufacture, etc. The sheet at the same time provides a record of the customers themselves, whose names are inscribed at suitable points of the sheet in divisions corresponding to the receiving points at which the purchasers are located.

Having thus described my invention, I claim as new, and desire to secure by Letters Patent:—

1. A rate and quotation sheet having rulings forming a series of spaces each having a shipping point inscribed therein, and also forming a series of further spaces each having a receiving point inscribed therein and at an angle to said first series, said rulings having intersecting columns each including one of said spaces having said points inscribed therein, shipping rates inscribed at the intersections of said columns, and further rulings forming subdivisions alined with the intersections of said columns, and having price quotations on merchandise inscribed therein.

2. A rate and quotation sheet comprising rulings forming a series of spaces having shipping points inscribed therein, and also forming a series of spaces having receiving points inscribed therein and at right angles to said first series, said rulings forming columns which each include one of said points, and forming sub-divisions at their intersections having shipping rates from said shipping points to said receiving points inscribed in said sub-divisions, said rulings forming further sub-divisions alined with the intersections of said columns, and having price quotations on merchandise inscribed therein, and still further sub-divisions, each alined with one of said further sub-divisions, and having inscribed therein dates on which said price quotations were made.

3. A rate and quotation sheet having rulings forming a series of spaces each having a shipping point inscribed therein, and also forming a series of further spaces each having a receiving point inscribed therein and at an angle to said first series, said rulings constituting intersecting columns each including one of said spaces having said points inscribed therein, shipping rates inscribed at the intersections of said columns, further rulings forming subdivisions alined with the intersections of said columns, and having price quotations on merchandise inscribed therein, and still further rulings forming subdivisions alined with the intersections of said columns and having customers' names inscribed therein.

In testimony whereof I have signed my name to this specification in the presence of two subscribing witnesses.

BENJAMIN ESTELL ALLISON.

Witnesses:
W. F. FAGUE,
C. A. BROOKE.